United States Patent [19]
Lenfant

[11] 3,820,872
[45] June 28, 1974

[54] RETRO-REFLECTOR

[75] Inventor: Rene Lenfant, Paray Vieille Poste, France

[73] Assignee: Compagnie Generale D'Electricite, Paris, France

[22] Filed: Dec. 27, 1972

[21] Appl. No.: 318,975

[30] Foreign Application Priority Data
Dec. 27, 1971 France .............................. 71.46760

[52] U.S. Cl. ................. 350/102, 350/103, 350/287
[51] Int. Cl. ............................................ G02b 5/12
[58] Field of Search .......... 350/102, 103, 287, 101, 350/100, 97, 286, 287, 107, 109

[56] References Cited
UNITED STATES PATENTS
18,937   9/1933   Oestnaes et al. .................... 350/102
2,055,298   9/1936   Leray ................................. 350/103

FOREIGN PATENTS OR APPLICATIONS
463,304   3/1937   Great Britain ..................... 350/102
468,168   6/1937   Great Britain ..................... 350/109

*Primary Examiner*—Ronald L. Wibert
*Assistant Examiner*—Michael J. Tokar
*Attorney, Agent, or Firm*—Sughrue, Rothwell, Mion, Zinn & Macpeak

[57] ABSTRACT

A retro-reflector optical device is formed by three prismatic blocks each having a first and second plane face, one constituting the plane reflecting surface and the other lying coplanar and fixed thereby to a plane base.

6 Claims, 3 Drawing Figures

RETRO-REFLECTOR

The present invention concerns retro-reflectors, that is, reflectors sending back a light ray parallel to its incident direction.

A retro-reflector comprising three plane mirrors whose edges are assembled, by cementing, for example, is known, these mirrors constituting a concave reflecting surface composed of three plane surfaces forming a trirectangular trihedron. This retro-reflector also comprises a base on which the assembled mirrors are fixed by means of a hardening adhesive substance moulded between a face of the base and the opposite surface of those mirrors to their reflecting surfaces.

The known retro-reflector described herebelow has disadvantages. Indeed, the assembling of the mirrors by cementing does not enable the perpendicularity of their planes to be obtained with great accuracy. Moreover, that faulty perpendicularity is further accentuated by the removal, after moulding, of the hardening cementing substance, subsequent to the relatively great volume and the uneven thickness of that substance. This removal causes, moreover, in the mirrors, internal tensions which deform their reflecting surfaces. Now, it is well-known that faulty orthogonality and faulty planeity of the mirrors cause a great decrease in the optical efficiency of the retro-reflector.

The aim of the present invention is to produce a retro-reflector not having the disadvantages of the above-mentioned known retro-reflector.

The present invention has for its object a retro-reflector comprising an optical device having at least a concave reflecting surface constituted by three plane reflecting surfaces forming a trirectangular trihedron, characterised more particularly in that the said optical device comprises at least three prismatic blocks each limited by at least a first and second plane face, the first plane face constituting one of the said plane reflecting surfaces, the said planes of the said second plane faces being coplanar, a plane base, and means for fixing the said second plane faces of the said blocks on the said plane base.

The present invention will be better understood from the following description given with reference to the accompanying drawing by way of illustration but having no limiting character, in which.

Figure 1:
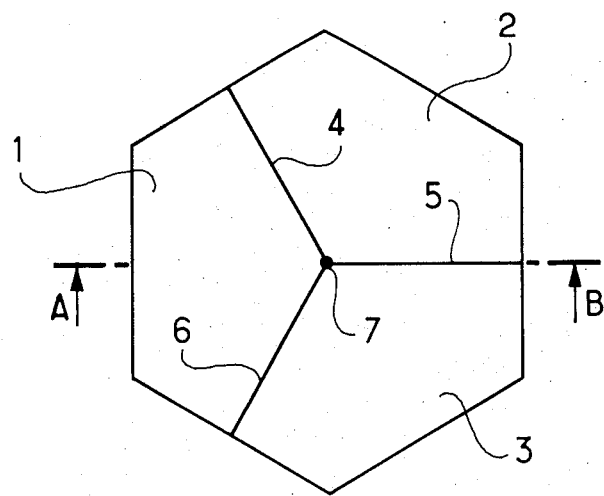
FIG. 1 is an embodiment of the retro-reflector according to the invention.
Figure 3:
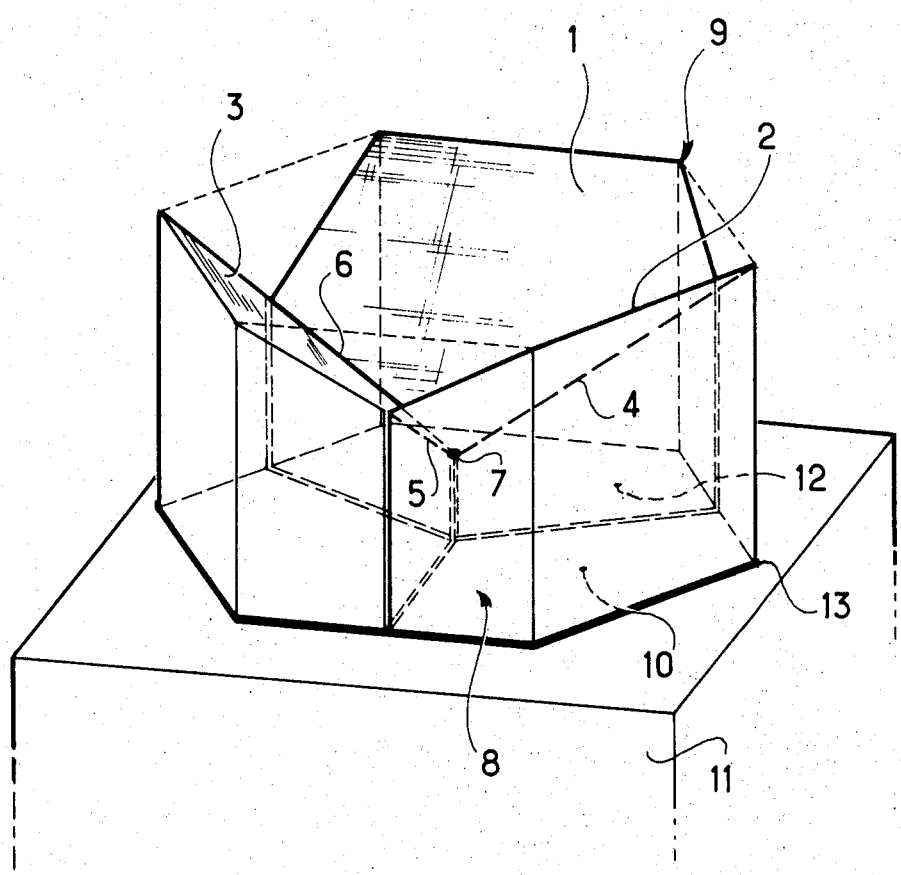

and FIG. 3 shows a perspective view of the retro-reflector illustrated in FIG. 1.

Figure 2:
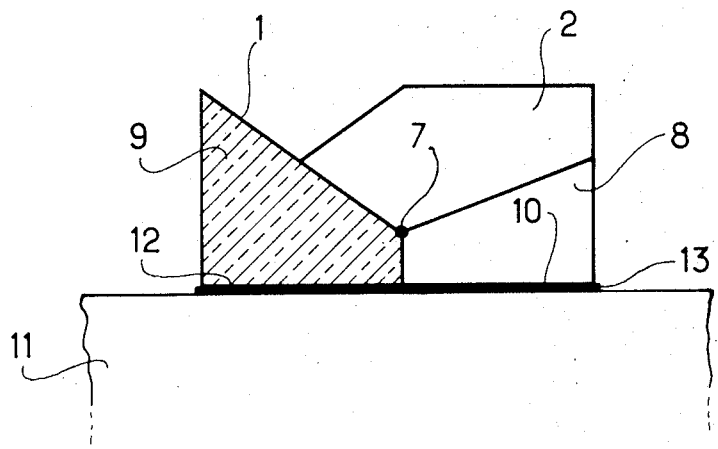
FIG. 2 is a partial cross-sectional view of the retro-reflector shown in FIG. 1.

In FIGS. 1, 2 and 3, the identical elements are designated by the same reference numerals.

FIGS. 1 and 3 show a retro-reflector comprising an optical system having a concave reflecting surface constituted by three plane surfaces 1, 2 and 3, intersecting two by two at right-angles along the ridges 4, 5 and 6 and forming thus a trirectangular trihedron having an apex 7. The concave reflecting surface is limited, in a known configuration, by a hexagonal rim so as to obtain a maximum optical efficiency.

FIG. 2 shows the retro-reflector in a partial view, cut in the plane AB shown in FIG. 1. The optical system is composed of three juxtaposed prismatic blocks such as the blocks 8 and 9, shown in FIG. 2, the third block not being shown in the figure. Each prismatic block is limited by a first and second plane face, the first plane face being constituted by one of the three plane surfaces. Thus, the block 8, for example, is limited by the plane surface 2 and by a second plane face 10 which is shown in a front view in FIG. 2. The second plane face 10 of the block 8 is placed in a same plane as the second plane face 12 of the block 9 and as the second plane face corresponding to the block not shown in FIG. 2.

As shown in FIGS. 2 and 3, the plane common to the second plane faces is, to great advantage, perpendicular to the ternary axis of symmetry of the trirectangular trihedron, the three prismatic blocks then being identical.

The retro-reflector comprises, moreover, a plane base 11 on which are fixed the second plane faces of the three blocks, by means, for example, of a thin film 13 of hardening adhesive substance.

The prismatic blocks such as 8 and 9, as well as the plane base 11 are, to great advantage, made of a same substance such as glass, for example.

The plane surfaces 1, 2 and 3 of the three blocks are coated with a reflecting layer, for example a metallic layer or multidielectric layers.

It is, of course, possible to fix, on a same base, several juxtaposed groups of three prismatic blocks identical to those described above, so as to produce a retro-reflector panel.

The retro-reflector illustrated by FIGS. 1, 2 and 3 has, in relation to the above-mentioned known retro-reflector, the advantage of being easy to produce and form very accurately. More particularly, the rigid structure of the prismatic blocks prevents any deforming of the planeity of the reflecting surfaces. Moreover, the angle formed between these reflecting surfaces is not affected by the removal of the film of hardening adhesive substance, the thickness of that film being very slight and even.

The retro-reflector according to the invention may be applied to the forming of retro-reflector panels having high optical efficiency, as required in laser systems.

I claim:

1. In a retro-reflector comprising an optical device having at least a concave reflecting surface constituted by three plane reflecting surfaces forming a trirectangular trihedron, the improvement wherein: said optical device comprises three juxtaposed prismatic blocks each comprising first and second oppositely directed plane faces, the first plane face for each block constituting one of said plane reflecting surfaces, the planes of the second plane faces being coplanar, a plane base, and means for fixing the second plane faces of said blocks on said plane base with said blocks contiguous.

2. The retro-reflector according to claim 1, wherein: said means for fixing the said second plane faces of the said blocks on the said plane base are constituted by a film of hardening adhesive substance deposited between each of the said second plane faces of the said blocks and said plane base.

3. The retro-reflector according to claim 1, wherein: said blocks are constituted by glass.

4. The retro-reflector according to claim 2, wherein: said blocks are constituted by glass.

5. The retro-reflector according to claim 3, wherein: said plane base is constituted by glass.

6. The retro-reflector according to claim 4, wherein: said plane base is constituted by glass.

* * * * *